US012623318B2

(12) United States Patent
Speckman et al.

(10) Patent No.: US 12,623,318 B2
(45) Date of Patent: May 12, 2026

(54) POWER TOOL WITH SHEET METAL FASTENER MODE

(71) Applicant: MILWAUKEE ELECTRIC TOOL CORPORATION, Brookfield, WI (US)

(72) Inventors: Levi D. Speckman, Elkhorn, WI (US); Jonathan E. Abbott, Milwaukee, WI (US); Mitchell G. Menard, Chicago, IL (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 375 days.

(21) Appl. No.: 18/132,795

(22) Filed: Apr. 10, 2023

(65) Prior Publication Data

US 2023/0321796 A1 Oct. 12, 2023

Related U.S. Application Data

(60) Provisional application No. 63/329,769, filed on Apr. 11, 2022.

(51) Int. Cl.
*B25B 21/00* (2006.01)
*B25B 21/02* (2006.01)
(Continued)

(52) U.S. Cl.
CPC ............ *B25B 21/002* (2013.01); *B25B 21/02* (2013.01); *B25F 5/001* (2013.01); *B25B 23/1475* (2013.01)

(58) Field of Classification Search
CPC ... B25B 21/002; B25B 21/02; B25B 23/1475; B25F 5/001
(Continued)

(56) References Cited

U.S. PATENT DOCUMENTS 5,657,417 A * 8/1997 Di Troia .................. B25F 5/00 173/148
5,903,462 A * 5/1999 Wagner .................. B25B 21/00 700/168
(Continued)

FOREIGN PATENT DOCUMENTS

WO 2011122362 A1 10/2011
WO 2011152136 A1 12/2011
WO 2021016437 A1 1/2021

OTHER PUBLICATIONS

Extended European Search Report for Application No. 23167275.9 dated Jul. 26, 2023 (8 pages).

*Primary Examiner* — Dariush Seif
(74) *Attorney, Agent, or Firm* — Michael Best & Friedrich LLP

(57) ABSTRACT

A power tool includes a housing, a motor supported within the housing, the motor including a rotor, a drive assembly operably coupled to the rotor, the drive assembly including an output configured to rotate about an axis in a first direction in response to forward operation of the motor and in a second, opposite direction in response to reverse operation of the motor, a sensor, a controller in communication with the sensor and the motor, the controller configured to control a forward operation of the motor according to a first set of parameters, during the forward operation of the motor, receive feedback from the sensor and estimate a number of rotations of the output based on the feedback from the sensor, and after the forward operation of the motor, control a reverse operation of the motor according to a second set of parameters different from the first set of parameters.

19 Claims, 5 Drawing Sheets

(51) Int. Cl.
*B25B 23/147* (2006.01)
*B25F 5/00* (2006.01)

(58) Field of Classification Search
USPC .......................................................... 173/179
See application file for complete search history.

(56) References Cited

U.S. PATENT DOCUMENTS 6,508,313 B1* 1/2003 Carney ............... B25B 23/1475 173/171
10,646,982 B2 5/2020 Dey, IV et al.
11,027,404 B2 6/2021 Malak et al.
11,855,567 B2* 12/2023 Friedman ................ B25B 21/02
2002/0060082 A1* 5/2002 Watanabe ........... B25B 23/1405 173/176
2003/0149508 A1* 8/2003 Watanabe ........... B25B 23/1405 73/862.23
2004/0045729 A1* 3/2004 Lehnert ................. B25B 23/145 173/176
2005/0109520 A1* 5/2005 Kawai ................. B25B 23/1475 173/183
2013/0025892 A1* 1/2013 Mashiko ............... B25B 21/026 173/2
2013/0062086 A1* 3/2013 Ito ....................... B25B 23/1475 173/1
2013/0063051 A1* 3/2013 Sterling .................. B25F 5/021 315/360
2013/0133911 A1* 5/2013 Ishikawa ............... B25B 21/026 173/176
2013/0264084 A1* 10/2013 Beckman ................ B25B 23/00 173/2
2015/0041164 A1* 2/2015 Sergyeyenko ........ B25B 23/147 173/176
2016/0079887 A1* 3/2016 Takano ................... H02P 1/028 318/431
2016/0268873 A1* 9/2016 Ikeda ..................... H02K 7/145
2016/0354889 A1* 12/2016 Ely .................... B23Q 17/2404
2017/0083014 A1* 3/2017 Conrad ................ G05B 19/425
2017/0120408 A1* 5/2017 Reese ..................... B23Q 17/22
2017/0246732 A1* 8/2017 Dey, IV ............... G01D 5/2006
2019/0227528 A1* 7/2019 Abbott ................. G05B 13/027
2019/0381648 A1* 12/2019 Wadeson .............. B25B 21/002
2022/0200511 A1* 6/2022 Friedman ................ B25B 23/18
2022/0299946 A1* 9/2022 Abbott ................... G06N 3/044
2023/0321796 A1* 10/2023 Speckman .............. B25B 21/02 81/54

* cited by examiner

POWER TOOL WITH SHEET METAL FASTENER MODE

CROSS-REFERENCE TO RELATED APPLICATIONS

The present application claims priority to U.S. Provisional Patent Application No. 63/329,769, filed Apr. 11, 2022, the entire content of which is incorporated herein by reference.

BACKGROUND

The present disclosure relates to a power tool, and more specifically, a rotary power tool (such as an impact driver, impact wrench, drill, powered screwdriver, or the like) with a sheet metal fastener operating mode.

Sheet metal fasteners are fasteners configured to pass through and secure at least one layer of sheet metal. Sheet metal fasteners have many names and varieties, including self-drilling screws, Tek screws, self-piercing screws, speed points, sharp tips, needlepoint screws, and zip screws.

SUMMARY

In some aspects, the present disclosure provides a power tool including a controller having a sheet metal fastener operating mode that provides different operating characteristics (motor speed, ramp up rate, etc.), depending on whether the power tool is operated in a forward (tightening) direction or a reverse (loosening) direction.

The present disclosure provides, in another aspect, a power tool including a housing, a motor supported within the housing, the motor including a rotor, a drive assembly operably coupled to the rotor, the drive assembly including an output configured to rotate about an axis in a first direction in response to forward operation of the motor and in a second direction opposite the first direction in response to reverse operation of the motor, a sensor, a controller in communication with the sensor and the motor, the controller configured to control a forward operation of the motor according to a first set of parameters, during the forward operation of the motor, receive feedback from the sensor and estimate a number of rotations of the output based on the feedback from the sensor, and after the forward operation of the motor, control a reverse operation of the motor according to a second set of parameters different from the first set of parameters.

The sensor may include at least one selected from a group consisting of a motor current sensor, a Hall effect sensor, a torque sensor, and a position sensor.

The first set of parameters may include at least one selected from a group consisting of a motor rotational speed limit, a motor rotational speed profile, a motor current limit, a motor current profile, a torque limit, a torque profile, a PWM limit, or a PWM profile.

The second set of parameters may include at least one selected from a group consisting of a motor rotational speed limit, a motor rotational speed profile, a motor current limit, a motor current profile, a torque limit, a torque profile, a PWM limit, or a PWM profile.

The drive assembly may include a camshaft configured to receive torque from the rotor and a hammer coupled to the camshaft.

The output may be an anvil configured to receive impacts from the hammer.

The output may be configured to couple to a tool bit for driving a fastener.

The controller may be configured to determine if the fastener has stripped during the forward operation or the reverse operation based on the feedback from the sensor.

The controller may be configured to generate an alert if the fastener has stripped.

The alert may include illuminating an indicator.

The second set of parameters may be based on whether the fastener has stripped.

At least one of the first set of parameters or the second set of parameters may be based on a property of the fastener.

The controller may be configured to determine the property of the fastener from a user input.

The second set of parameters may be based on the estimated number of rotations.

The power tool may include a trigger switch configured to be actuated to energize the motor.

The second set of parameters may include a sensitivity of the trigger switch such that the sensitivity of the trigger switch is different during the forward operation than during the reverse operation.

The housing may include a motor housing portion in which the motor is supported and a handle portion extending from the motor housing portion.

The controller may be located on a PCB within the handle portion.

The present disclosure provides, in another aspect, a power tool including a housing, a motor supported within the housing, the motor including a rotor, a drive assembly operably coupled to the rotor, the drive assembly including an output configured to rotate about an axis in a first direction in response to forward operation of the motor and in a second direction opposite the first direction in response to reverse operation of the motor, wherein the output is configured to couple to a tool bit for driving a fastener, a sensor, a controller in communication with the sensor and the motor, the controller configured to control a forward operation of the motor according to a first set of parameters, during the forward operation of the motor, receive feedback from the sensor, determine if the fastener has stripped based on the feedback from the sensor, and generate an alert if the fastener has stripped.

The controller may be configured to control a subsequent forward operation of the motor or a reverse operation of the motor according to a second set of parameters different than the first set of parameters if the fastener has stripped.

The sensor may include at least one selected from a group consisting of a motor current sensor, a Hall effect sensor, a torque sensor, and a position sensor.

The first set of parameters may include at least one selected from a group consisting of a motor rotational speed limit, a motor rotational speed profile, a motor current limit, a motor current profile, a torque limit, a torque profile, a PWM limit, or a PWM profile.

The second set of parameters may include at least one selected from a group consisting of a motor rotational speed limit, a motor rotational speed profile, a motor current limit, a motor current profile, a torque limit, a torque profile, a PWM limit, or a PWM profile.

The present disclosure provides, in another aspect, a power tool including a housing, a motor supported within the housing, the motor including a rotor, a drive assembly operably coupled to the rotor, the drive assembly including an output configured to rotate about an axis in a first direction in response to forward operation of the motor and in a second direction opposite the first direction in response to reverse operation of the motor, wherein the output is configured to couple to a tool bit for driving a fastener, a controller in communication with the motor, the controller configured to control a forward operation of the motor according to a first set of parameters, and in response to an interruption of the forward operation, control a subsequent forward operation of the motor according to a second set of parameters different than the first set of parameters.

The first set of parameters may include at least one selected from a group consisting of a motor rotational speed limit, a motor rotational speed profile, a motor current limit, a motor current profile, a torque limit, a torque profile, a PWM limit, or a PWM profile.

The second set of parameters may include at least one selected from a group consisting of a motor rotational speed limit, a motor rotational speed profile, a motor current limit, a motor current profile, a torque limit, a torque profile, a PWM limit, or a PWM profile.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

DETAILED DESCRIPTION

Figure 1:
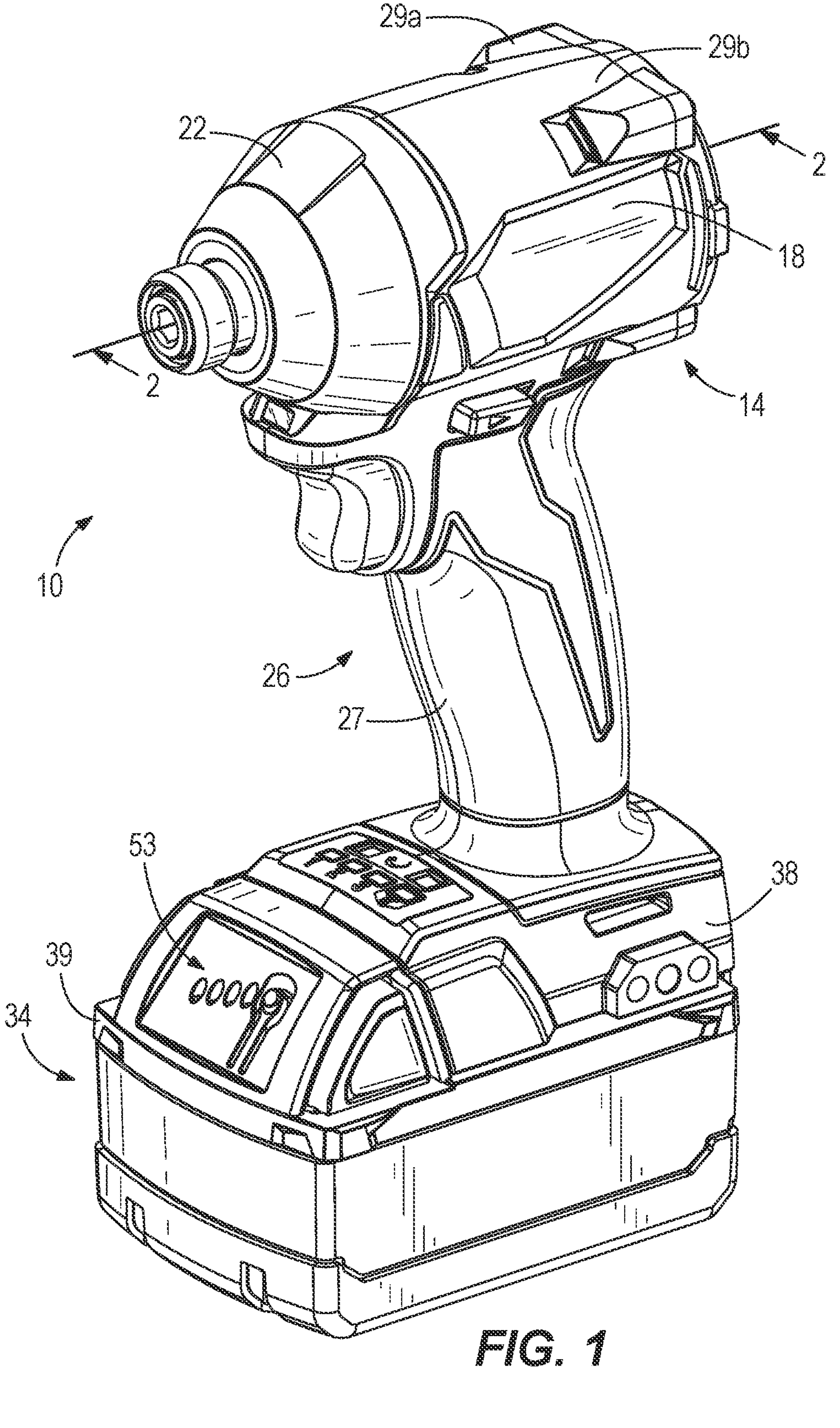
FIG. 1 is a perspective view of a power tool according to an embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways.

FIG. 1 illustrates a power tool 10 in the form of a rotary impact tool and more specifically, an impact driver. The power tool 10 includes a housing 14 with a motor housing portion 18, a front housing portion or gear case 22 coupled to the motor housing portion 18 (e.g., by a plurality of fasteners), and a handle portion 26 disposed underneath the motor housing portion 18. The handle portion 26 includes a grip 27 that can be grasped by a user operating the power tool 10. In the illustrated embodiment, the handle portion 26 and the motor housing portion 18 are defined by cooperating clamshell halves **29*a*, 29*b*. In other embodiments, the housing 14** may be constructed in other ways.

With continued reference to FIG. 1, the power tool 10 has a battery pack 34 removably coupled to a battery receptacle 38 located at a bottom end of the handle portion 26. The battery pack 34 includes a housing 39 supporting battery cells 40 (FIG. 2), which are electrically connected to provide the desired output (e.g., nominal voltage, current capacity, etc.) of the battery pack 34. A battery power display 53 indicates the power level remaining in the battery pack 34 (FIG. 1). In other embodiments, the power tool 10 may include a power cord for electrically connecting the power tool 10 to a source of AC power. As a further alternative, the power tool 10 may be configured to operate using a different power source (e.g., a pneumatic power source, etc.).

Figure 2:
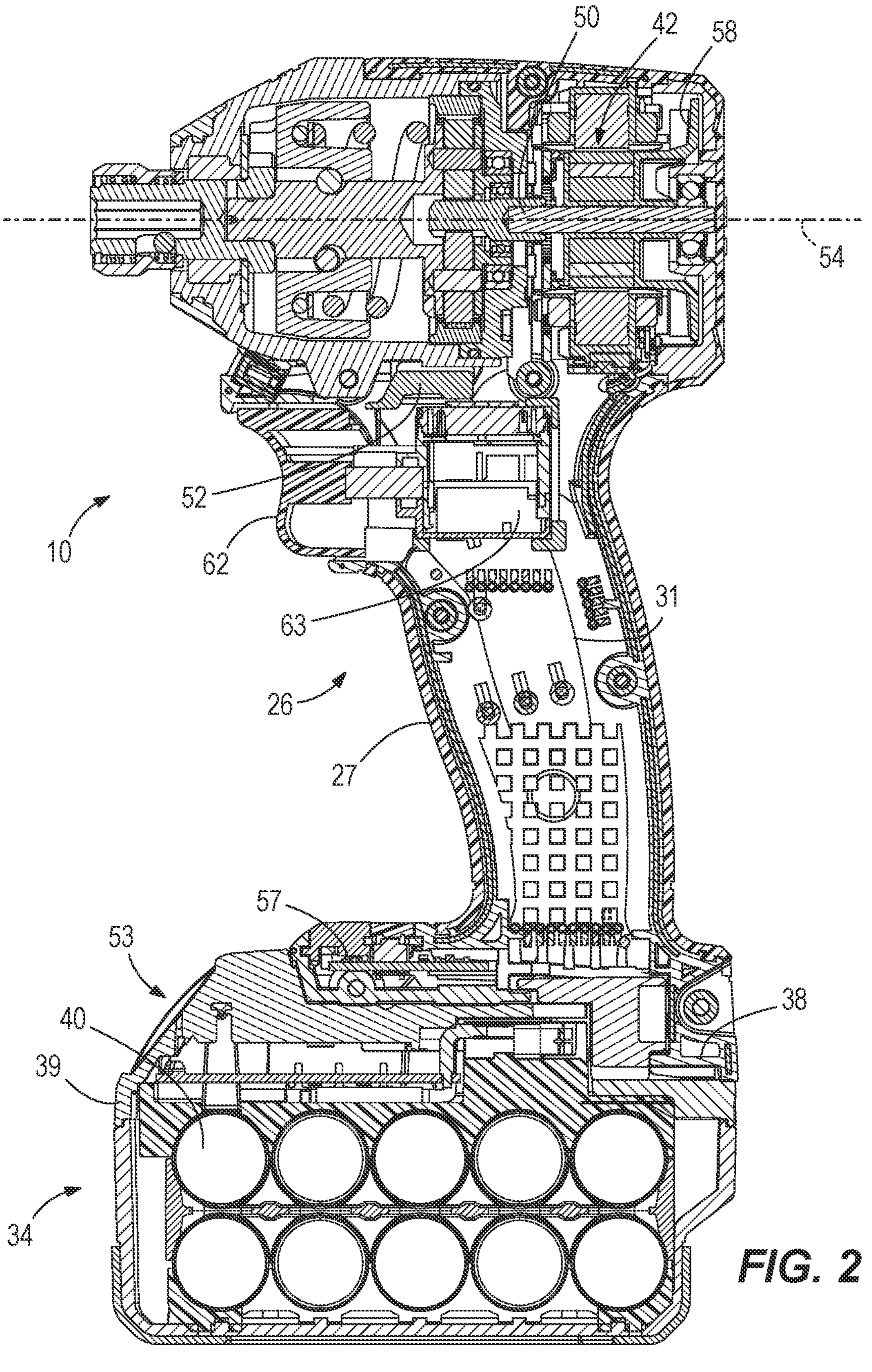
FIG. 2 is a cross-sectional view of the power tool of FIG. 1.

Referring to FIG. 2, an electric motor 42, supported within the motor housing portion 18, receives power from the battery pack 34 when the battery pack 34 is coupled to the battery receptacle 38. The motor 42 is preferably a brushless direct current ("BLDC") motor having a rotor or motor shaft 50. A forward/reverse switch 52, extending laterally from the housing 14, allows an operator to change the direction that the motor 42 rotates the output shaft 50. The output shaft 50 is rotatable about an axis 54. For example, the forward/reverse switch 52 may have a first position in which the motor 42 operates in a forward (i.e., clockwise or tightening) direction and a second position in which the motor 42 operates in a second (i.e., counter-clockwise or loosening) direction.

With continued reference to FIG. 2, the power tool 10 includes a mode change switch 57 for toggling the power tool 10 between different operating modes, as described in greater detail below. In the illustrated embodiment, the mode change switch 57 is located above the battery receptacle 38. A fan 58 is coupled to the output shaft 50 (e.g., via a splined connection) behind the motor 42. The power tool 10 also includes a trigger 62 slidably coupled to the handle portion 26 and that interfaces with a trigger switch 63 within the handle portion 26. The trigger switch 63 is actuatable via the trigger 62 to selectively electrically connect the motor 42 and the battery pack 34 to provide DC power to the motor 42.

Figure 3:
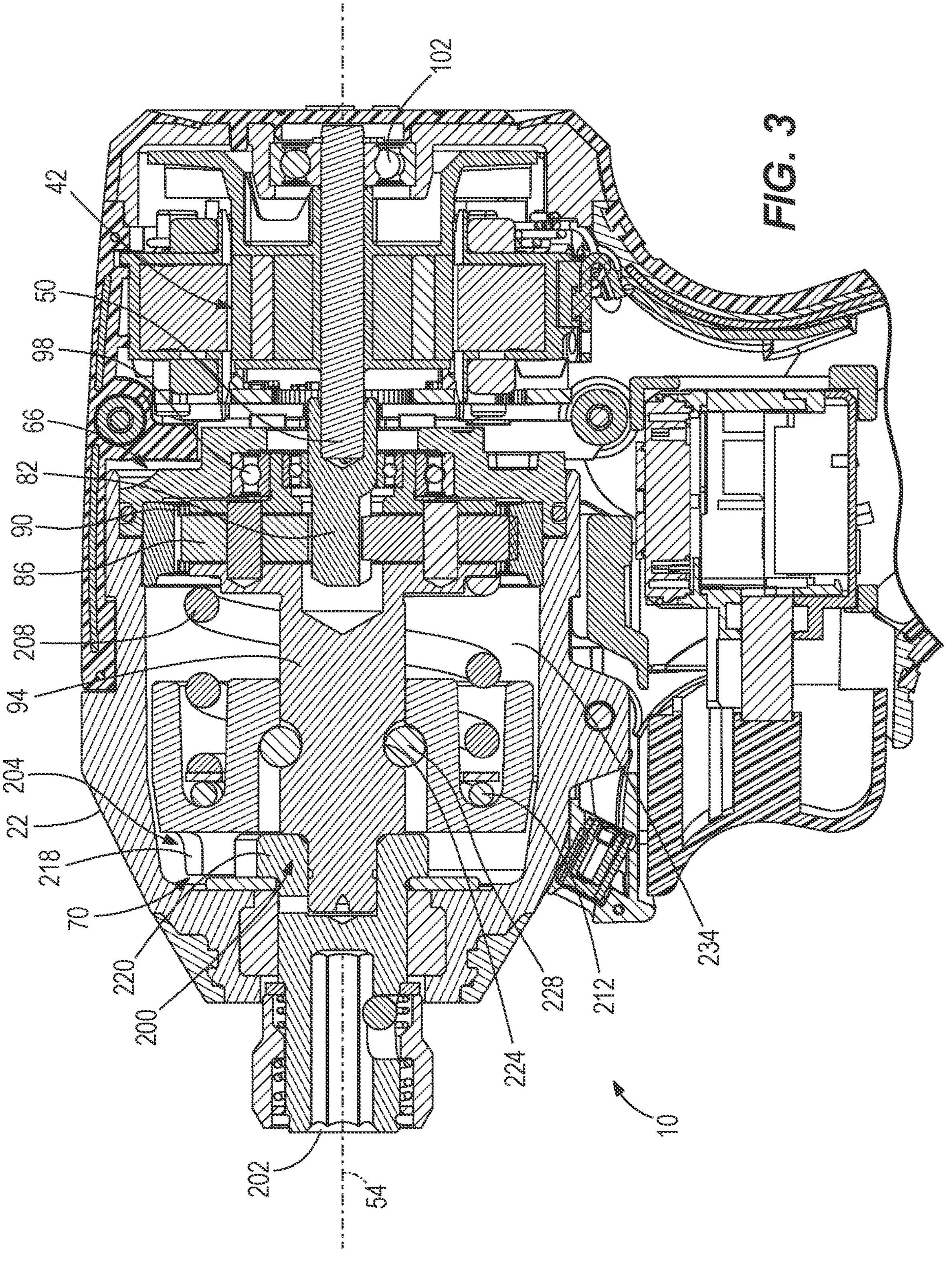
FIG. 3 is an enlarged cross-sectional view illustrating a portion of the power tool of FIG. 1.

With reference to FIG. 3, the impact wrench 10 further includes a gear assembly 66 coupled to the motor output shaft 50 and a drive assembly 70 coupled to an output of the gear assembly 66. The gear assembly 66 is at least partially housed within the gear case 22. The gear assembly 66 may be configured in any of a number of different ways to provide a speed reduction between the output shaft 50 and an input of the drive assembly 70.

The illustrated gear assembly 66 includes a pinion 82 formed on the motor output shaft 50, a plurality of planet gears 86 meshed with the pinion 82, and a ring gear 90 meshed with the planet gears 86 and rotationally fixed within the gear case 22. The planet gears 86 are mounted on a camshaft 94 of the drive assembly 70 such that the camshaft 94 acts as a planet carrier. Accordingly, rotation of the output shaft 50 rotates the planet gears 86, which then orbit along the inner circumference of the ring gear 90 and thereby rotate the camshaft 94. The gear assembly 66 thus provides a gear reduction ratio from the output shaft 50 to the camshaft 94. The output shaft 50 is rotatably supported by a first or forward bearing 98 and a second or rear bearing 102.

The drive assembly 70 of the power tool 10 includes an anvil or output drive 200 extending from the gear case 22 with a bit holder 202 to which a tool element (e.g., a screwdriver bit; not shown) can be coupled for performing work on a workpiece (e.g., a fastener). The drive assembly

70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 66 includes the camshaft 94, a hammer 204 supported on and axially slidable relative to the camshaft 94, and the anvil 200.

The drive assembly 70 further includes a spring 208 biasing the hammer 204 toward the front of the impact wrench 10 (i.e., toward the left in FIG. 3). In other words, the spring 208 biases the hammer 204 in an axial direction toward the anvil 200, along the axis 54. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs 218 on the hammer 204 engage with corresponding anvil lugs 220 and rotation of the hammer 204 momentarily stops. A washer may be located between the anvil 200 and a front end of the gear case 22 in some embodiments. The camshaft 94 further includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs 218 and the anvil lugs 220 are engaged and the camshaft 94 continues to rotate.

Referring to FIGS. 1-3, in operation of the power tool 10, an operator depresses the trigger 62 to activate the motor 42, which continuously drives the gear assembly 66 and the camshaft 94 via the output shaft 50. As the camshaft 94 rotates, the cam balls 228 drive the hammer 204 to co-rotate with the camshaft 94, and the hammer lugs 218 engage, respectively, driven surfaces of the anvil lugs 220 to provide an impact and to rotatably drive the anvil 200 and the tool element about the axis 54, which, in the illustrated embodiment, is the rotational axis of the anvil 200. In other embodiments, the anvil 200 may be rotatable about an axis different than the axis 54 of the motor output shaft 50.

After each impact, the hammer 204 moves or slides rearward along the camshaft 94, away from the anvil 200, so that the hammer lugs disengage the anvil lugs 220. As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs 218 disengage the respective anvil lugs 220, the hammer 204 continues to rotate and moves or slides forwardly, toward the anvil 200, as the spring 208 releases its stored energy, until the drive surfaces of the hammer lugs 218 re-engage the driven surfaces of the anvil lugs 220 to cause another impact.

Figure 4:
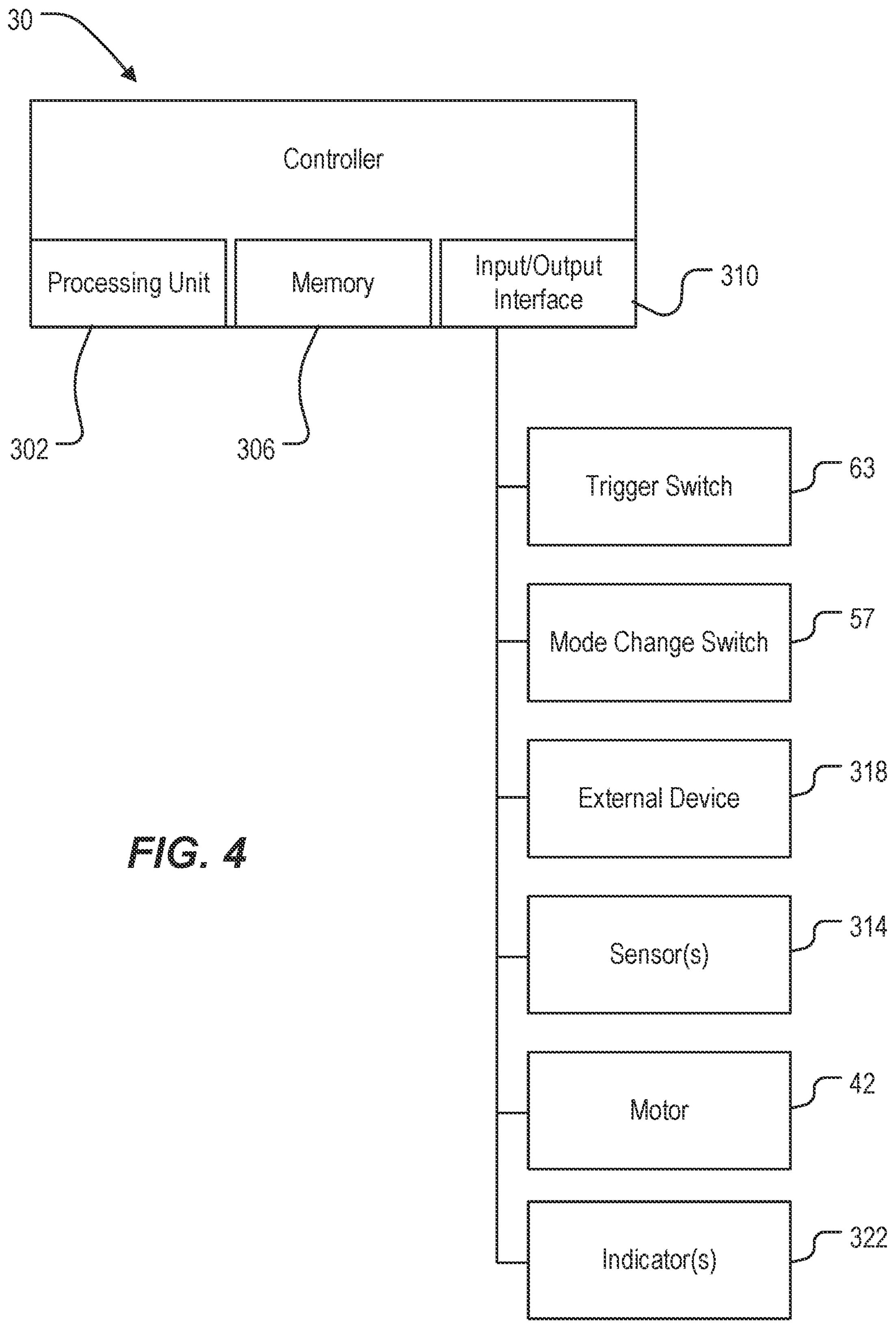
FIG. 4 is a schematic diagram illustrating a controller of the power tool of FIG. 1.
Figure 5:
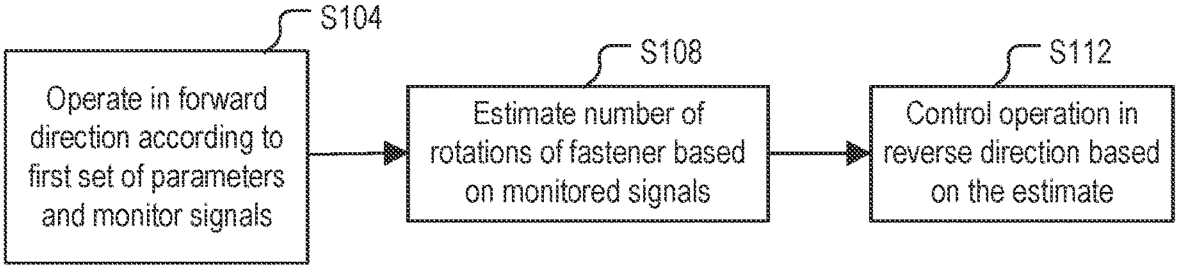
FIG. 5 is a diagram illustrating an operating sequence, which may be performed by the controller of FIG. 4.

With reference to FIG. 4, the illustrated power tool 10 further includes a controller 30. The controller 30 may be mounted on a printed circuit board (PCB) 31 disposed in the handle portion 26 of the housing 14. In other embodiments, the controller 30 may be located elsewhere within the housing 14. The controller 30 is electrically and/or communicatively connected to a variety of modules or components of the power tool 10. In some embodiments, the controller 30 includes a plurality of electrical and electronic components that provide power, operational control, and protection to the components and modules within the controller 30 and/or power tool 10. For example, the controller may include, among other things, a processing unit 302 (e.g., a microprocessor, a microcontroller, or another suitable programmable device), a memory 306, and an input/output interface 310. In some embodiments, the controller 30 may additionally or alternatively include features and elements of the controller 226 described in U.S. Pat. No. 10,646,982, assigned to Milwaukee Electric Tool Corporation, the entire content of which is incorporated herein by reference.

With continued reference to FIG. 4, the controller 30 is connected to various components of the power tool 10 via the input/output interface 310. For example, the illustrated controller 30 is electrically and/or communicatively coupled to the trigger switch 63, mode change switch 57, and the motor 42 (e.g., to the stator windings of the motor 42 via switching electronics, such as MOSFETs, IGBTs, or the like). The illustrated controller 30 is also connected to sensors 314, which may include one or more Hall sensors, current sensors, among other sensors, such as, for example, one or more voltage sensors, one or more temperature sensors, and one or more torque sensors. The sensors 314 may provide motor feedback information to the controller 30, such as an indication (e.g., a pulse) when a magnet of the motor's rotor 50 rotates across the face of that Hall sensor. Based on the motor feedback information from the sensors 314, the controller 30 can determine the position, velocity, and acceleration of the rotor 50. In response to the motor feedback information and the signals from the trigger switch 63, the controller 30 may transmit control signals to drive the motor 42. For instance, by selectively enabling and disabling the switching electronics, power received via the battery pack 34 is selectively applied to stator coils of the motor 42 to cause rotation of its rotor 50. The motor feedback information may be used to provide closed-loop feedback to control the speed of the motor 42 to be at a desired level. In some embodiments, the sensors 314 may also include one or more anvil position sensors, hammer positions sensors, and/or impact sensors that provide data from which the controller 30 may determine the rotation of the anvil 200.

The controller 30 may include one or more operating modes as described in greater detail below. The operating modes may be stored within the memory 306 of the controller and toggled between either automatically or in response to a user input (e.g., by actuating the mode change switch 57). In some embodiments, the operating modes described herein may be programmed and/or selected via an external device 318 (e.g., a smartphone, computer, accessory, or the like), which may communicate with the controller 30 via any suitable wired or wireless data connection.

FIGS. 5-8 illustrate exemplary operating sequences S100, S200, S300, S400 of the power tool 10 that may be performed by the controller 30. One or more of operating sequences S100, S200, S300, S400 may occur in parallel. In some embodiments, the operating sequences S100, S200, S300, S400 may each be associated with one or more modes selected by the user. In some embodiments, the operating sequences S100, S200, S300, S400 are enabled in response to a user selecting a sheet metal fastener mode, in which operation of the power tool 10 is optimized for driving and/or removing fasteners (e.g., sheet metal screws) from a sheet metal workpiece.

Users who are drilling sheet metal fasteners may occasionally strip the fastener. In this case, it may be desirable to stop operation and then remove the fastener. In operating sequence S100 (FIG. 5), the controller 30 may monitor the sensors 314 while driving of the fastener in the forward direction according to a first set of parameters in step S104. The first set of parameters may include, without limitation, a rotational speed of the motor 42, a motor current limit or profile, a torque limit or torque profile, or a PWM limit or profile. While driving the fastener, the controller 30 estimates the rotations (i.e., count of rotations or total rotated angle) of the fastener at step S108, based on feedback from the sensors 314. If the power tool 10 is then switched to reverse (via the forward/reverse switch 52), indicating that the user has stripped the fastener and wishes to remove the fastener, the controller 30 may then control operation of the power tool 10 according to a second set of parameters different from the first set of parameters. For example, the rotational speed of the motor 42 and/or the maximum torque setting may be set to a greater value during the reverse operation at step S112 than in the preceding forward operation at step S104. In some embodiments, the second parameters may be selected or varied by the controller 30 based on the estimated number of rotations determined in step S108.

The estimate of the rotations in step S108 can be determined using a state machine algorithm for the controller 30 that looks for individual thresholds between phases such as starting, drilling, fastening, seating, seated, and stripped. Criteria and thresholds to move between phases include sudden increases or decreases in motor speed or current, as determined from the sensors 314. In other embodiments, a machine learning model may be used, in which signals from the sensors 314 are fed into a classifier of the controller 30, such as a DNN or RNN, that can predict the phase. In a machine learning implementation of a reverse operation at step S112, a stateful machine learning model (such as an RNN) may form a state during at least one forward operation of the fastener (e.g., step S104). Upon switching to reverse, at least part of the state formed may be passed as input to the reverse algorithm logic.

For a stripped fastener, the fastener may not easily back off until the tool is angled to the workpiece such that the threads engage. In some embodiments, the sensors 314 may include an IMU or accelerometer to detect motion of the housing 14 of the power tool 10 or an angled orientation relative to the workpiece so as to better predict when the fastener will back off. Other sensors 314 such as the motor current sensor may also be monitored for changes to determine when the fastener is backing off.

In some embodiments, the reverse operation at step S112 may also be controlled based upon additional factors, such as the gauges of sheet metal, fastener size, fastener length, bit tip type, secondary material, etc. For instance, pointed tip screws may need to be backed off fewer rotations because the taper of the screw design. As another example, larger screws may be desired to be backed off faster than smaller screws that may be harder to catch in one's hand. For instance, hex engagements can be backed off faster than Phillips because Phillips engagements more often strip the screw head or lose contact.

At least some of the variety of additional factors could be determined automatically during operation by comparing data from the sensors 314 with a lookup table stored in the memory 306 and correlating sensor data with particular fastener configurations. The sensor data may also be processed, averaged, or otherwise analyzed over time to populate the lookup table. For example, a user may seat hundreds of the same type of fastener sequentially. The tool may recognize the fastener type after many operations by storing data obtained from the sensors 314 and then comparing subsequent data from the sensors 314 against the stored data. As another example, the type or quality of screw engagement may be recognized by how often a user loses engagement with a fastener (Phillips while stripping engages four times per output rotation and are thus recognizable).

Alternatively, or additionally, the variety of additional factors associated with a fastener could be ascertained based on user input. In particular, a mode for sheet metal screws may allow a user to input parameters such as length, diameter, bit tip style, brand, etc. (e.g., via the external device 318). This can be used in customizing a reverse operation of the power tool 10 in step S112.

The reverse operation in step S112 may include a variety of different control algorithms. For example, the reverse operation in step S112 may have a limit for how hard to impact the anvil 200 in reverse (this helps protect workpieces) and/or a ramp function for which the anvil 200 is only impacted as hard as it needs to break free the fastener. In some embodiments, there may be one, two, or more target speeds for after breakaway (such as distinguished by time or associated with rotations of the anvil 200). Alternatively, the reverse operation may have a ramped down profile that gradually tapers. The reverse operation may stop after a given amount of time or rotation. The stopping may happen due to a motor coast, motor brake, or motor ramp down.

In some embodiments, the reverse operation controlled by the controller 30 may include adjustable trigger sensitivity such that the controller 30 may be more sensitive to trigger release in the reverse operation of step S112 than the forward operation of step S104. For example, when in reverse, if a user starts to release the trigger 62, the power tool 10 may cease operation or exaggerate the degree of trigger release. In some embodiments, the reverse mode may be designed so that if a user is increasing the trigger depression after partial release the power tool 10 does not increase its output speed. Alternatively, the output speed may slowly ramp back up. Thus, in some embodiments, sensitivity of the trigger switch 63 is different in the reverse operation S112 than in the forward operation S104.

The sensors 314 may continue to be monitored during the reverse operation of step S112 for lost fastener engagement. Furthermore, lost fastener engagement sensitivity may be increased after breakaway. In some embodiments the power tool 10 may cease operation or slow down briefly after detected breakaway and then resume a higher level of speed.

In some embodiments, the controller 42 may pulse the motor 42 during the reverse operation of step S112. This has the advantage of increasing visibility of the fastener during reversing and providing a haptic feel to a user.

The controller 30 may additionally or alternatively include other "reverse" operations, including a tool body rotation-controlled mode for which the output 200 of the tool 10 may rotate in either forwards or backwards (in some cases, independently of the position of the forward/reverse switch 52) based on the orientation and/or rotation of the tool housing 14 (as detected by the IMU or accelerometer). In another embodiment, the power tool 10 may be able to selectively enable or disable impacts produced by the drive assembly 70 (i.e., switching between impact mode and a direct drive mode or equivalent mode). This can help users use the tool 10 for delicate operations.

Some users may use a sheet metal screw mode to seat other kinds of fasteners. This can include deck screws and lag bolts. Whether the user uses such a mode for these other fasteners, or the tool has additional modes dedicated to these other applications, the controlled reverse operations described herein may still be advantageous, as discussed with reference to certain non-limiting examples below.

Some users may use sheet metal screws to drill pilot holes. This helps to properly locate a hole and help install when the object being fastened is positioned into place. Drilling a pilot hole with a sheet metal screw involves first the tool operating in forwards and then the tool operating in reverse to remove the screw. As mentioned previously, the controller 30 may customize its reverse operation S112 based on its preceding forward operation S104.

In some embodiments, the power tool 10, after automatic "seating" of the screw with automatic shutoff, may then reverse if the user keeps the trigger 62 pulled and rotates the housing 14 of the power tool 10 in a counterclockwise (loosening) direction. The benefit to this is that the user can quickly drilling in and reverse the screw to their liking with minimal settings on the tool 10. In other embodiments, the controller 30 may automatically stop driving the fastener when it is determined that the fastener is seated, initiate a timer, and, if the trigger switch 63 remains actuated after a predetermined time, assume that the user wishes to remove the screw and automatically begin the reverse operating step S112 without further user input. The seat and remove steps may optionally repeat in some embodiments or modes—potentially with increasing rotations each repetition—to effectively drill and/or tap a workpiece.

Sometimes, the power tool 10 may not fully complete a sheet metal screw fastening operation. For example, a user might let up on a trigger stopping the tool 10 prematurely. A sheet metal screw algorithm may also stop early with thicker gauges of metal and wider screws. These conditions produce sensor signals that may resemble sensor signals observed during seating but are often burrs or transitions from drilling to screwing. The result is that a screw has become inserted into a workpiece but has not been seated. Sheet metal screw algorithms that look for a phased approach of first drilling and then seating may not properly seat the sheet metal screw because the drilling is already complete.

Referring to FIG. 4, in some embodiments the power tool may have a forward sheet metal operating sequence S200 that operates in accordance with a first set of parameters after a first trigger pull at step S204. The first set of parameters may include, without limitation, a rotational speed of the motor 42, a motor current limit or profile, a torque limit or torque profile, or a PWM limit or profile. If operation of the power tool 10 is then stopped and restarted within the sheet metal mode at step S208, the controller 30 may then implement a second, different control logic and operate in the forward direction according to a second set of parameters different from the first set of parameters at step S212. As mentioned, the power tool 10 may have ceased operation due to suspected seating of the fastener or a trigger release by the user. Other causes of premature shutdowns are possible such as gate drive refreshes, over-currents, and requests by the battery pack 34. In some cases, the controller 30 of the power tool 10 may have detected lost engagement with the fastener and prematurely stopped operation of the tool 10.

In some cases, the controller 30 may have an algorithm that detects if the drilling phase of the screw seating is complete. In the case of a tool restart, the controller 30 may only operate differently than before if the tool 10 had suspected at least the drilling phase to be complete. Sometime the tips of sheet metal screw get damaged or overheat and a user may cease operation of the tool 10 to get a new screw to continue drilling. In some cases, the extent of drilling is estimated and used to cause the tool 10 to still operate differently than before even if drilling was not complete.

In some cases, the controller 30 may monitor the time between shutdown and restart, the time between the trigger 62 being released and repressed, the motion of the housing 14 between steps, or other sensor information gleaned from the sensors 314 to discern if the user is still engaging with a particular screw or screw location or with a new screw or a new screw location.

The second set of parameters defining the second (different) operating step in step S212 may include a non-shutoff algorithm, especially with low max speed for which a user must let go of the trigger 62 to stop the tool 10, a different shutoff algorithm (machine learned algorithm, smaller state machine or starting at a different state, different thresholds etc.), and/or a change in operating parameters (ex: more gradual ramped speeds and slower max speed may help algorithms be more accurate during seating). The controller 30 may alert users that its algorithm is different from the first (ex: via LEDs, sound, vibration, etc.) by sending a signal from the controller 30 to an indicator 322 (FIG. 4).

Figure 7:
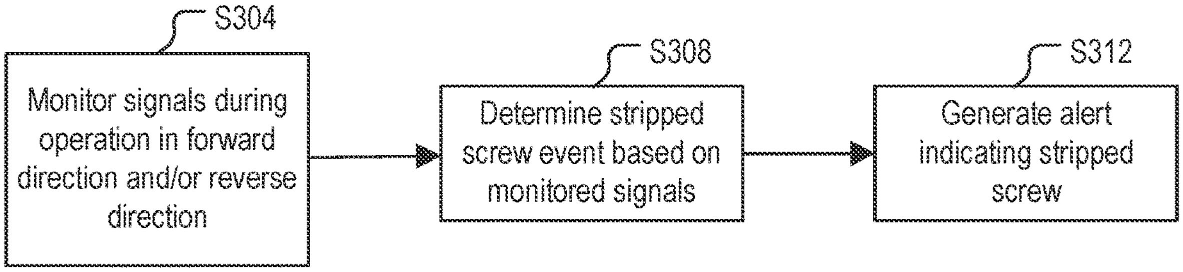
FIG. 7 is a diagram illustrating another operating sequence, which may be performed by the controller of FIG. 4.
Figure 8:
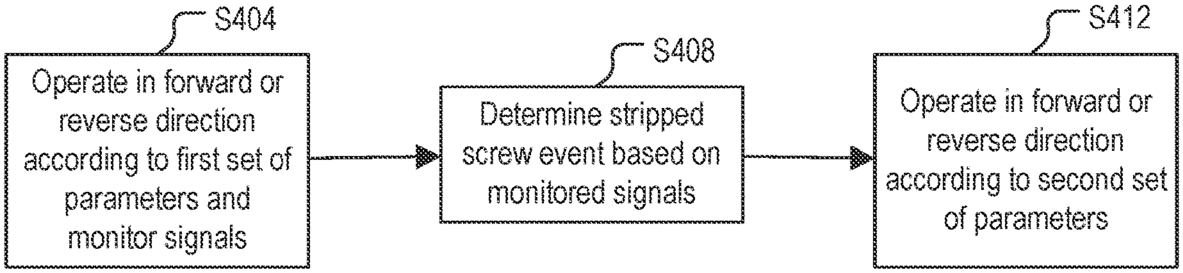
FIG. 8 is a diagram illustrating another operating sequence, which may be performed by the controller of FIG. 4.

Referring to FIGS. 7-8, a sheet metal fastener may occasionally strip such that it spins in a workpiece. In operating sequences S300 and S400, the controller 30 may identify that the fastener has stripped (e.g., the signals from the sensors 314 indicate low levels of resistance) at steps S308, S408, and the controller 30 may then respond.

In some embodiments, the controller 30 may alert the user at step S312. This may be useful because a screw may "appear" secured or may have a small amount of thread engagement remaining with a workpiece. The alert may be a visual indication such as an LED flashing sequence/a screen/etc., an auditory warning such as a buzzer or beep, a motor vibration, or an alert in the form of a change in operation of the tool (ex: slow down to 10% speed to "show" the strip). These actions may be collectively referred to as sending a signal from the controller 30 to the indicator 322.

Figure 6:
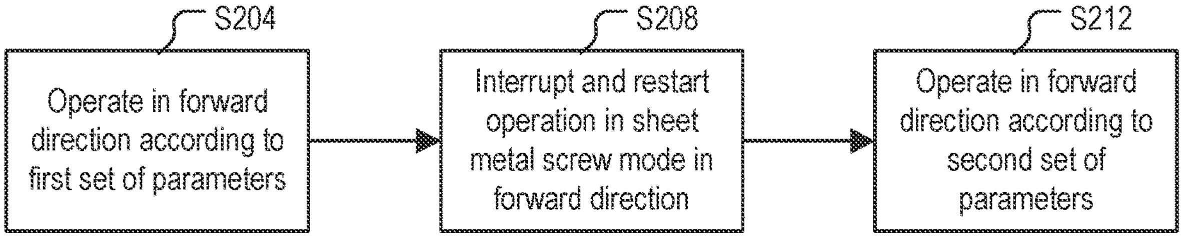
FIG. 6 is a diagram illustrating another operating sequence, which may be performed by the controller of FIG. 4.

Alternatively, or in addition, the controller 30 may change the tool's operation (FIG. 6). For example, the controller 30 may automatically switch to reverse to remove said screw, the controller 30 may gradually stop rotation to highlight that the screw is in fact stripped, and/or the controller 30 may recognize stripping and adjust an internal parameter for a following screw seating mode use.

Although the operating modes and sequences are described above with reference to the rotary impact tool 10 illustrated in FIGS. 1-3, it should be understood that the controller 30 and control modes, sequences, and steps described herein may also be incorporated into other types of fastener-driver power tools, including, but not limited to, drills, powered screwdrivers, and the like.

Various features and aspects of the present disclosure are set forth in the following claims.

What is claimed is:

1. A power tool comprising:

a housing;

a motor supported within the housing, the motor including a rotor;

a drive assembly operably coupled to the rotor, the drive assembly including an output configured to rotate about an axis in a first direction in response to forward operation of the motor and in a second direction opposite the first direction in response to reverse operation of the motor, the output configured to couple to a tool bit for driving a fastener;

a trigger switch configured to be actuated to energize the motor;

a sensor; and a controller in communication with the sensor and the motor, the controller configured to:

control a forward operation of the motor according to a first set of parameters, during the forward operation of the motor, receive feedback from the sensor and estimate a number of rotations of the output based on the feedback from the sensor, determine if the fastener is seated, stop operation of the motor in response to determining that the fastener is seated, initiate a timer after the motor is stopped and the trigger switch remains actuated for a first amount of time, after the forward operation of the motor, control a reverse operation of the motor according to a second set of parameters different from the first set of parameters, and initiate the reverse operation of the motor upon detecting that the trigger switch is actuated for the first amount of time.

2. The power tool of claim 1, wherein the sensor includes at least one selected from a group consisting of a motor current sensor, a Hall effect sensor, a torque sensor, and a position sensor.

3. The power tool of claim 1, wherein the first set of parameters includes at least one selected from a group consisting of a motor rotational speed limit, a motor rotational speed profile, a motor current limit, a motor current profile, a torque limit, a torque profile, a PWM limit, or a PWM profile.

4. The power tool of claim 3, wherein the second set of parameters includes at least one selected from a group consisting of a motor rotational speed limit, a motor rotational speed profile, a motor current limit, a motor current profile, a torque limit, a torque profile, a PWM limit, or a PWM profile.

5. The power tool of claim 1, wherein the drive assembly includes a camshaft configured to receive torque from the rotor and a hammer coupled to the camshaft, and wherein the output is an anvil configured to receive impacts from the hammer.

6. The power tool of claim 1, wherein the controller is configured to determine if the fastener has stripped during the forward operation or the reverse operation based on the feedback from the sensor.

7. The power tool of claim 6, wherein the controller is configured to generate an alert if the fastener has stripped.

8. The power tool of claim 7, wherein the alert includes illuminating an indicator.

9. The power tool of claim 6, wherein the second set of parameters is based on whether the fastener has stripped.

10. The power tool of claim 1, wherein at least one of the first set of parameters or the second set of parameters is based on a property of the fastener.

11. The power tool of claim 10, wherein the controller is configured to determine the property of the fastener from a user input.

12. The power tool of claim 1, wherein the second set of parameters is based on the estimated number of rotations.

13. The power tool of claim 1, wherein the second set of parameters includes a sensitivity of the trigger switch such that the sensitivity of the trigger switch is different during the forward operation than during the reverse operation.

14. The power tool of claim 1, wherein the housing includes a motor housing portion in which the motor is supported and a handle portion extending from the motor housing portion, and wherein the controller is located on a PCB within the handle portion.

15. A power tool comprising:

a housing;

a motor supported within the housing, the motor including a rotor;

a drive assembly operably coupled to the rotor, the drive assembly including an output configured to rotate about an axis in a first direction in response to forward operation of the motor and in a second direction opposite the first direction in response to reverse operation of the motor, wherein the output is configured to couple to a tool bit for driving a fastener;

a trigger switch configured to be actuated to energize the motor;

a sensor; and a controller in communication with the sensor and the motor, the controller configured to:

control a forward operation of the motor according to a first set of parameters, during the forward operation of the motor, receive feedback from the sensor, determine if the fastener is seated, stop operation of the motor in response to determining that the fastener is seated, initiate a timer after the motor is stopped and the trigger switch remains actuated for a first amount of time, determine if the fastener has stripped based on the feedback from the sensor, generate an alert if the fastener has stripped, and initiate the reverse operation of the motor upon detecting that the trigger switch is actuated for the first amount of time.

16. The power tool of claim 15, wherein the controller is configured to control a subsequent forward operation of the motor or a reverse operation of the motor according to a second set of parameters different than the first set of parameters if the fastener has stripped.

17. The power tool of claim 16, wherein the sensor includes at least one selected from a group consisting of a motor current sensor, a Hall effect sensor, a torque sensor, and a position sensor, wherein the first set of parameters includes at least one selected from a group consisting of a motor rotational speed limit, a motor rotational speed profile, a motor current limit, a motor current profile, a torque limit, a torque profile, a PWM limit, or a PWM profile, and wherein the second set of parameters includes at least one selected from a group consisting of a motor rotational speed limit, a motor rotational speed profile, a motor current limit, a motor current profile, a torque limit, a torque profile, a PWM limit, or a PWM profile.

18. A power tool comprising:

a housing;

a motor supported within the housing, the motor including a rotor;

a drive assembly operably coupled to the rotor, the drive assembly including an output configured to rotate about an axis in a first direction in response to forward operation of the motor and in a second direction opposite the first direction in response to reverse operation of the motor, wherein the output is configured to couple to a tool bit for driving a fastener;

a trigger switch configured to be actuated to energize the motor; and a controller in communication with the motor, the controller configured to:

control a forward operation of the motor according to a first set of parameters, in response to an interruption of the forward operation, control a subsequent forward operation of the motor according to a second set of parameters different than the first set of parameters, determine if the fastener is seated, stop operation of the motor in response to determining that the fastener is seated, initiate a timer after the motor is stopped and the trigger switch remains actuated for a first amount of time, and initiate a reverse operation of the motor upon detecting that the trigger switch is actuated for the first amount of time.

19. The power tool of claim 18, wherein the first set of parameters includes at least one selected from a group consisting of a motor rotational speed limit, a motor rotational speed profile, a motor current limit, a motor current profile, a torque limit, a torque profile, a PWM limit, or a PWM profile, and wherein the second set of parameters includes at least one selected from a group consisting of a motor rotational speed limit, a motor rotational speed profile, a motor current limit, a motor current profile, a torque limit, a torque profile, a PWM limit, or a PWM profile.

* * * * *